United States Patent
Kitagawa

(10) Patent No.: US 8,146,124 B2
(45) Date of Patent: Mar. 27, 2012

(54) CAMERA ADAPTER FOR REMOTE CONTROLLING A CAMERA, CONTROL METHOD THEREOF, AND STORAGE MEDIUM

(75) Inventor: Eiichiro Kitagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 465 days.

(21) Appl. No.: 12/184,771

(22) Filed: Aug. 1, 2008

(65) Prior Publication Data

US 2009/0040331 A1    Feb. 12, 2009

(30) Foreign Application Priority Data

Aug. 6, 2007    (JP) .................. 2007-204572

(51) Int. Cl.
*H04N 7/173*    (2006.01)
*H04N 9/04*    (2006.01)
*H04N 5/222*    (2006.01)

(52) U.S. Cl. .............. 725/105; 348/207.99; 348/211.99; 348/333.11; 348/333.05

(58) Field of Classification Search .............. 348/207.1, 348/211.4, 143, 159, 333.05, 333.12, 333.11, 348/211.1–211.3, 211.8, 211.13, 211.14, 348/333.07, 333.13, 372, 207.99–207.11, 348/211.99; 725/105

See application file for complete search history.

(56) References Cited

U.S. PATENT DOCUMENTS

| | | | |
|---|---|---|---|
| 6,380,972 B1* | 4/2002 | Suga et al. ............... | 348/211.99 |
| 6,967,675 B1* | 11/2005 | Ito et al. ..................... | 348/207.1 |
| 7,327,387 B2* | 2/2008 | Tanaka et al. ........... | 348/207.99 |
| 7,340,766 B2* | 3/2008 | Nagao et al. .................. | 725/105 |
| 7,683,933 B2* | 3/2010 | Tanaka ..................... | 348/207.11 |
| 2001/0025322 A1 | 9/2001 | Song et al. | |
| 2003/0043272 A1* | 3/2003 | Nagao et al. ............... | 348/207.1 |
| 2007/0070240 A1* | 3/2007 | Oya ............................. | 348/375 |
| 2007/0209056 A1* | 9/2007 | Mayuzumi .................... | 725/105 |

FOREIGN PATENT DOCUMENTS

| | | |
|---|---|---|
| JP | 2000-099697 A | 4/2000 |
| JP | 2001-197429 | 7/2001 |
| JP | 2001-285371 | 10/2001 |
| JP | 2005-167641 A | 6/2005 |

OTHER PUBLICATIONS

The above references were cited in a Jan. 6, 2012 Japanese Office Action, a copy of which is enclosed without an English Translation, that issued in Japanese Patent Application No. 2007-204572.

* cited by examiner

*Primary Examiner* — Lin Ye
*Assistant Examiner* — Marly Camargo
(74) *Attorney, Agent, or Firm* — Cowan, Liebowitz & Latman, P.C.

(57) ABSTRACT

An adapter connected to a device and also connected to a client terminal via a network displays an operation window corresponding to the process mode of the device on the client terminal and remote-controls the operation of the device based on an operation signal for the operation window. When the process mode is a remote control mode that allows the client terminal to read out data accumulated in the device, the client terminal displays an image for which open setting is done by the device.

11 Claims, 18 Drawing Sheets

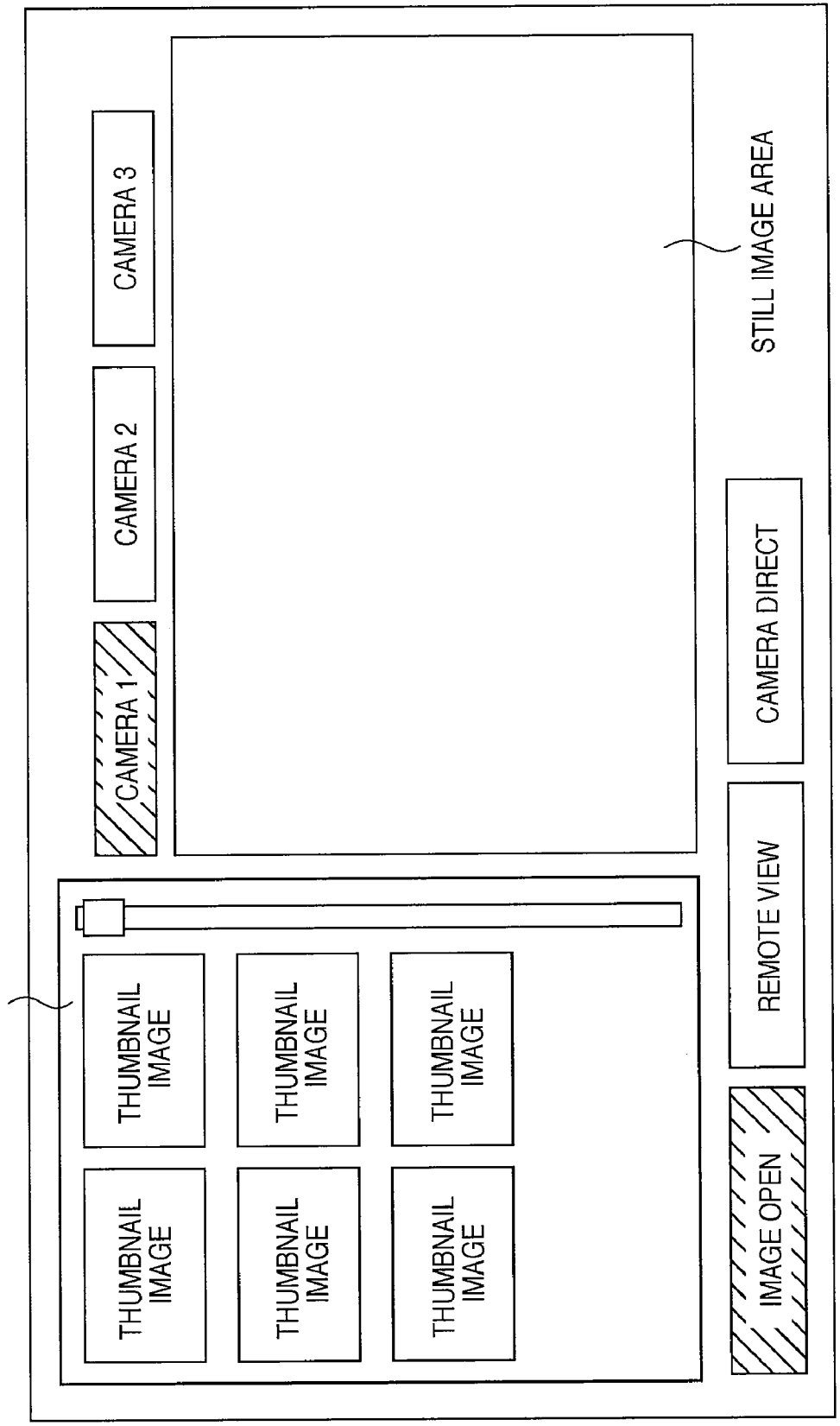

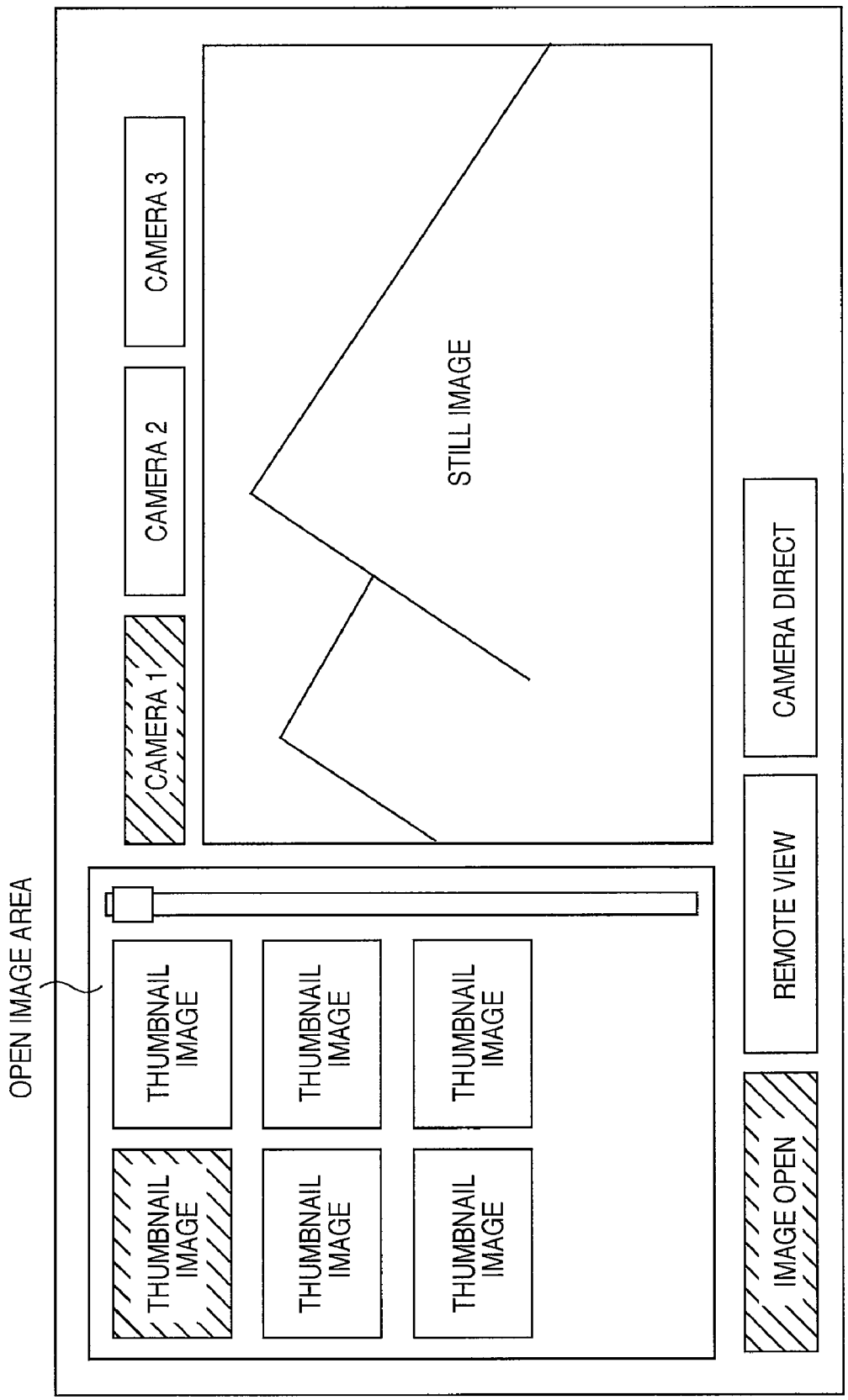
F I G. 4B

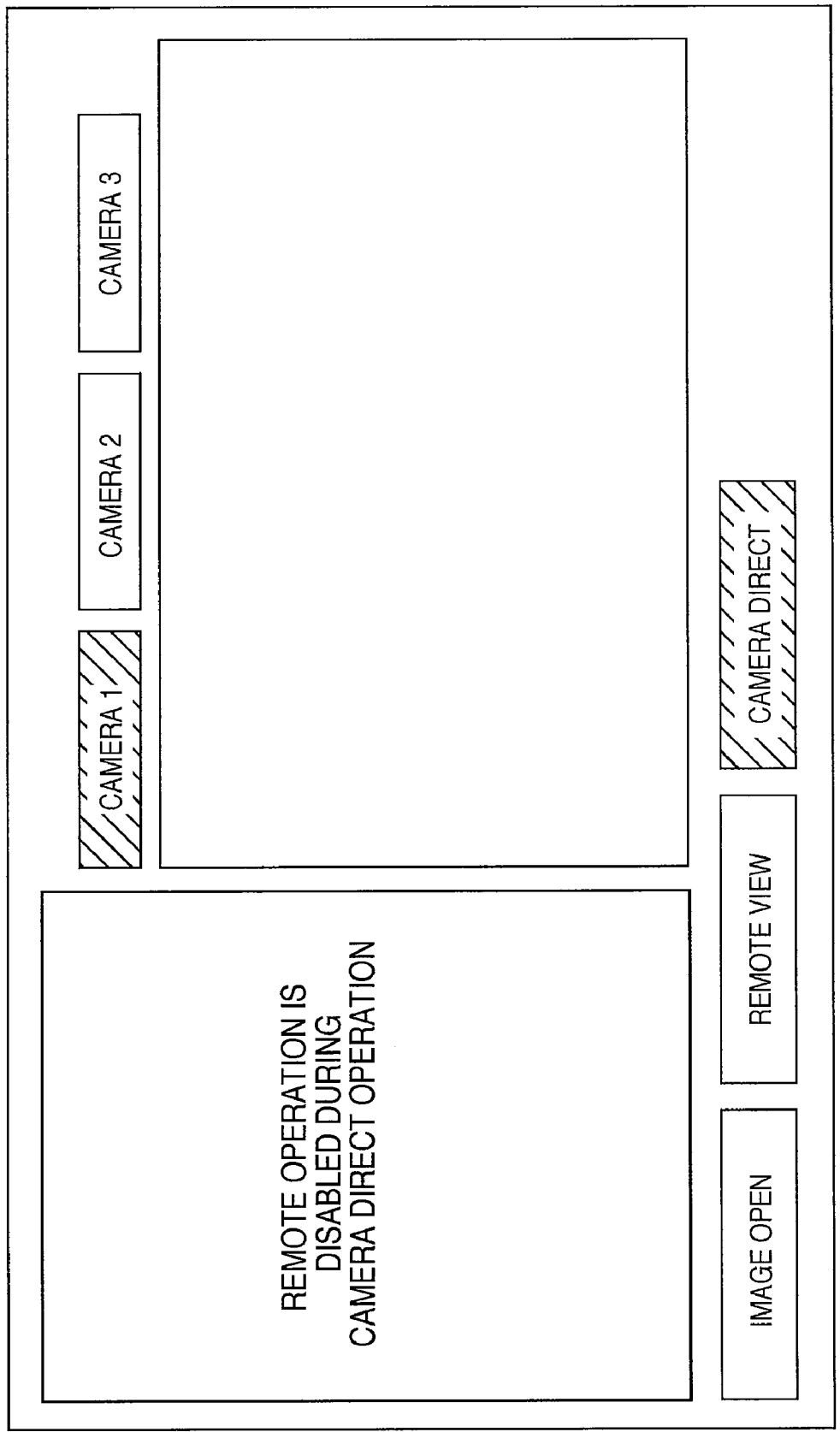

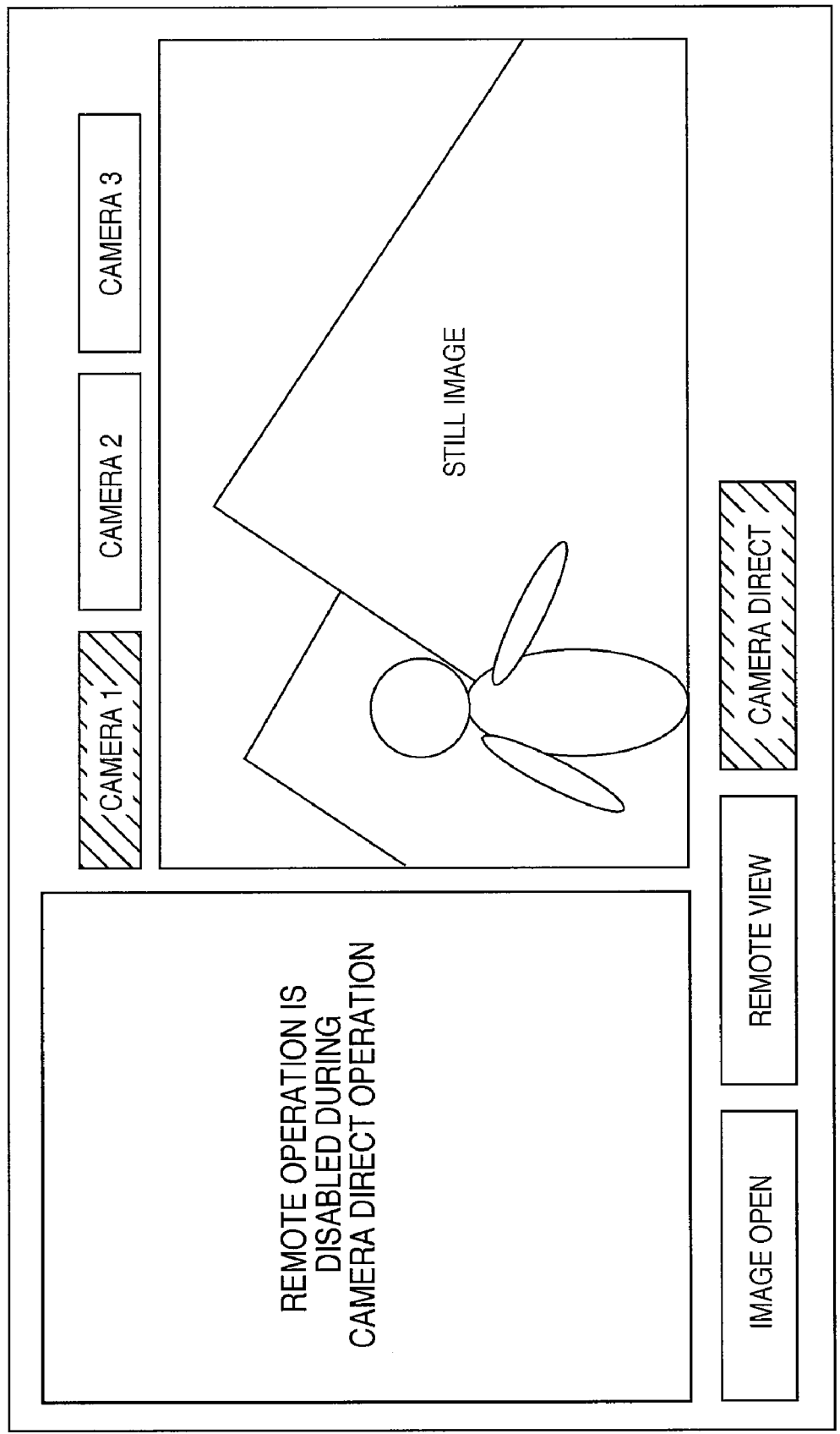

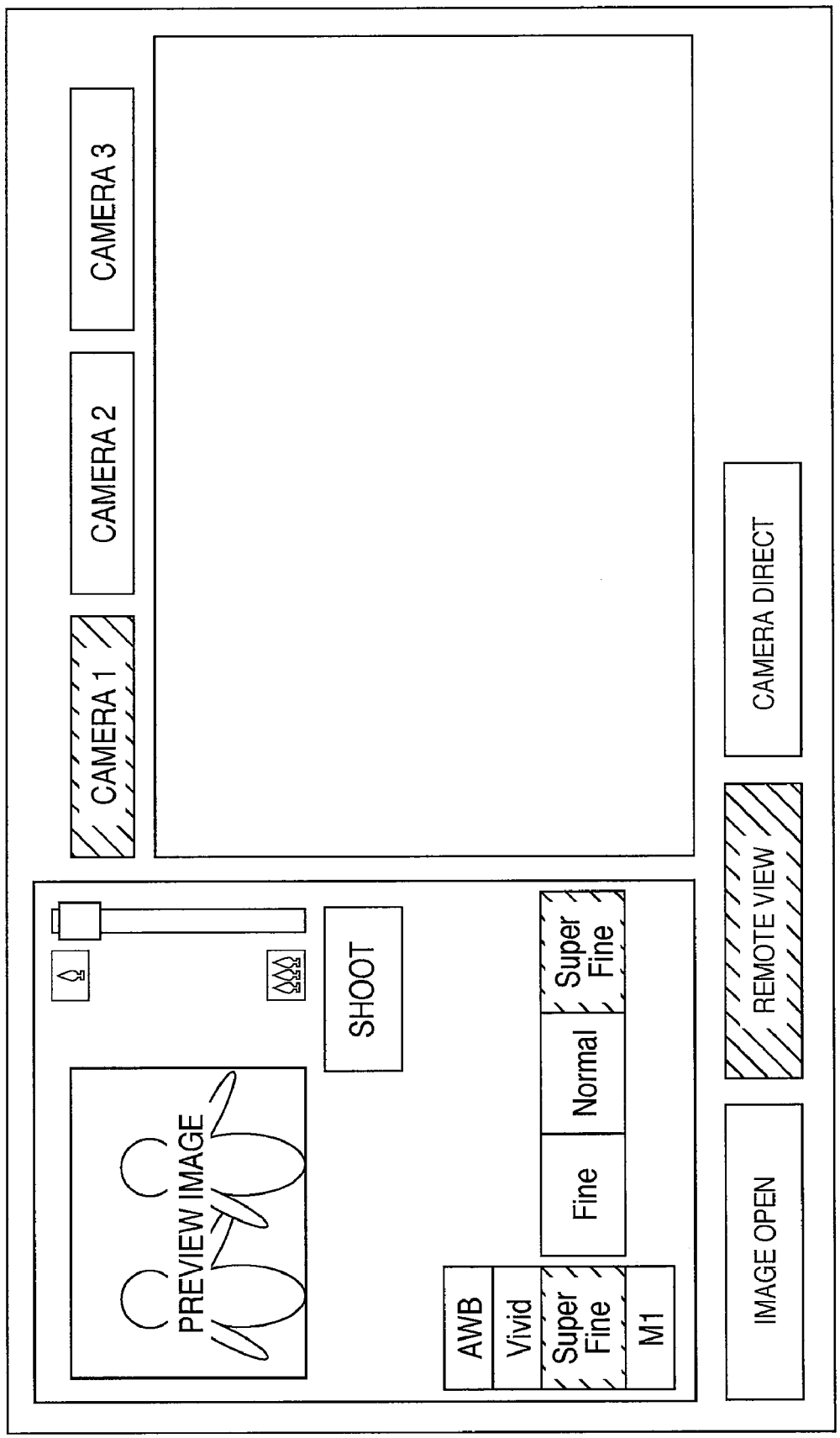

F I G. 9
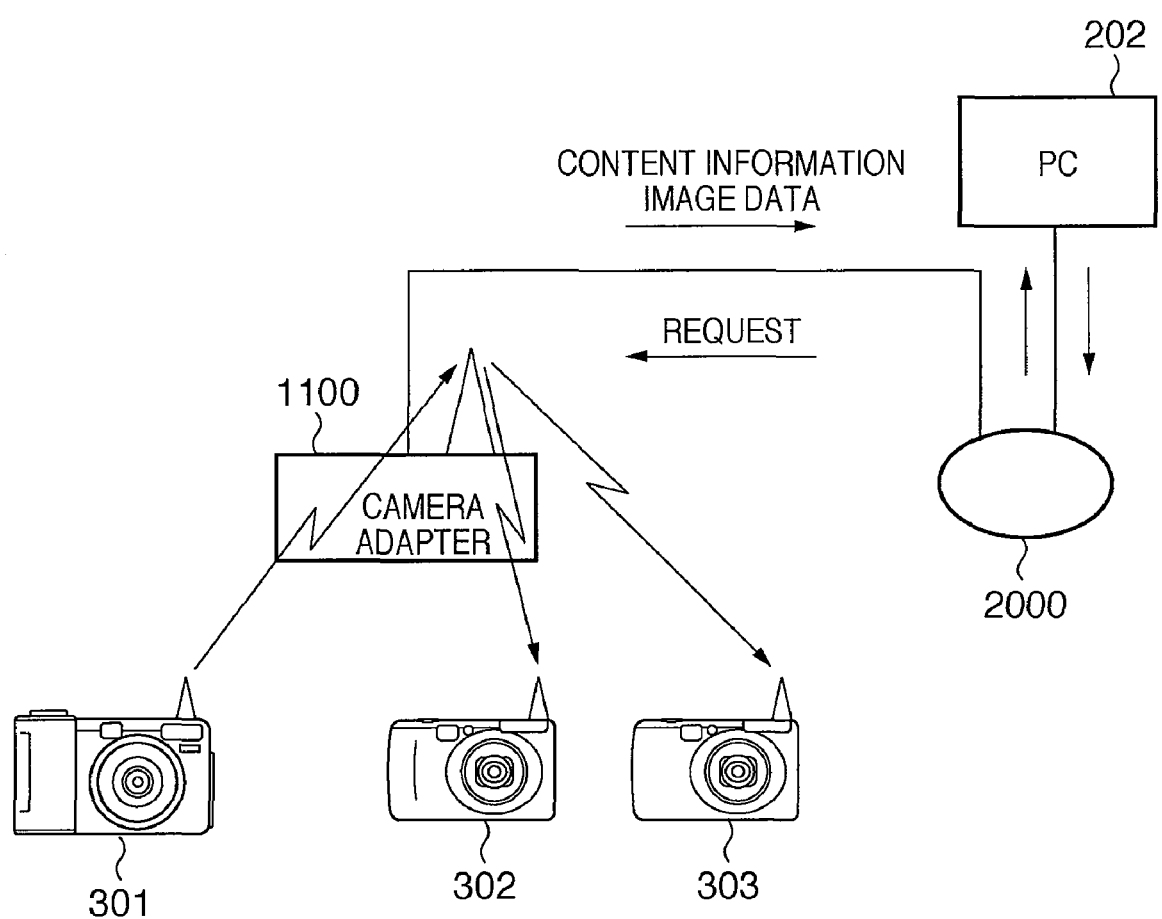

CAMERA ADAPTER FOR REMOTE CONTROLLING A CAMERA, CONTROL METHOD THEREOF, AND STORAGE MEDIUM

BACKGROUND OF THE INVENTION

1. Field of the Invention

The present invention relates to a communication control technique of making the operation window of a device open on a network.

2. Description of the Related Art

There are conventionally products which connect a device to a network and make the contents or control of the device open to terminals on the network.

For example, a NAS (Network Attached Storage) product connects a hard disk to a network and makes its contents open. Some NAS products can, for example, connect an external hard disk via a USB (Universal Serial Bus) interface and open the contents.

As for a camera, a network camera product having a network connection function and an HTTP server function enables a terminal connected to a network to view a sensed live image using a browser.

Additionally, for a digital camera having a network connection function, a method of updating sensed images to a server has been proposed (e.g., Japanese Patent Laid-Open No. 2001-197429).

There is also proposed a method of acquiring the information of a device connected to a non-IP network and dynamically creating a homepage for controlling the device (e.g., Japanese Patent Laid-Open No. 2001-285371).

According to the above-described prior arts, however, for a device which has a plurality of modes and changes the operable function depending on a set mode, a user interface open on a network does not reflect the mode of the device.

Particularly when the mode setting of the device which is being connected to the network has changed, it is impossible to appropriately change the user interface open on the network in accordance with the mode.

The relationship between mode change and a user interface will be explained here, assuming that a digital camera open on a network has a plurality of modes. Assume that the digital camera has a plurality of modes to be described below. In a remote control mode, the camera captures images under the control of the host apparatus. In a direct transfer mode, images are sent to the host apparatus by the operation of the camera. In a remote viewfinder mode (remote shooting mode), shutter shooting is performed from the host apparatus. When this digital camera is made open on the network, it is not possible to open a user interface capable of an appropriate operation corresponding to each mode.

Additionally, in making images accumulated in the digital camera open on the network, it is not easy to select the images to be made open.

SUMMARY OF THE INVENTION

The present invention has been made to solve the above-described problems, and has as its object to provide a communication control apparatus and method which implement the following functions. An operation window corresponding to the mode of a connected device is made open to a client apparatus on a network, thereby allowing an operation corresponding to the mode of the device via the network. It is another object of the present invention to allow the device to easily select images to be made open on the network.

In order to achieve the above objects, a communication control apparatus of the present invention and a communication control method in the communication control apparatus have the following arrangement.

According to one aspect of the present invention, there is provided a communication control apparatus connected to or incorporated in an image capturing apparatus, comprises: a determination unit adapted to determine a process mode of the image capturing apparatus, wherein the process mode includes at least a first mode which allows a client apparatus connected to the communication control apparatus via a network to read out image data accumulated in the image capturing apparatus, a second mode which transfers image data accumulated in the image capturing apparatus to the client apparatus in accordance with an operation on the image capturing apparatus, and a third mode which causes the image capturing apparatus to perform shooting based on a shooting instruction from the client apparatus; and a display control unit adapted to instruct the client apparatus to display an operation window corresponding to the process mode determined by the determination unit.

According to another aspect of the present invention, there is provided a communication control method of a communication control apparatus connected to or incorporated in an image capturing apparatus, comprises: a determination step of determining a process mode of the image capturing apparatus, wherein the process mode includes at least a first mode which allows a client apparatus connected to the communication control apparatus via a network to read out image data accumulated in the image capturing apparatus, a second mode which transfers image data accumulated in the image capturing apparatus to the client apparatus in accordance with an operation on the image capturing apparatus, and a third mode which causes the image capturing apparatus to perform shooting based on a shooting instruction from the client apparatus; and a display control step of causing the client apparatus to display an operation window corresponding to the process mode determined in the determination step.

According to the present invention having the above-described arrangement, an operation window corresponding to the mode of a connected device is made open to a client apparatus on a network, thereby allowing an operation corresponding to the mode of the device via the network. Additionally, the device can easily select images to be made open on the network.

Further features of the present invention will become apparent from the following description of exemplary embodiments (with reference to the attached drawings).

BRIEF DESCRIPTION OF THE DRAWINGS

FIG. 4A is a view showing an example of a window made open to a client PC in the image open mode of this embodiment;

FIG. 4B is a view showing another example of the window made open to the client PC in the image open mode of this embodiment;

FIG. 4C is a view showing an example of the window made open to the client PC in the camera direct mode of this embodiment;

FIG. 4D is a view showing another example of the window made open to the client PC in the camera direct mode of this embodiment;

FIG. 4F is a view showing an example of the window made open to the client PC in the remote view mode of this embodiment;

FIG. 9 is a view showing a system arrangement according to the third embodiment;

DESCRIPTION OF THE EMBODIMENTS

Preferred embodiments of the present invention will now be described in detail with reference to the accompanying drawings. Components described in the following embodiments are merely examples, and the present invention is not limited to the illustrated components.

First Embodiment

● Arrangements of System and Apparatus

Figure 1:
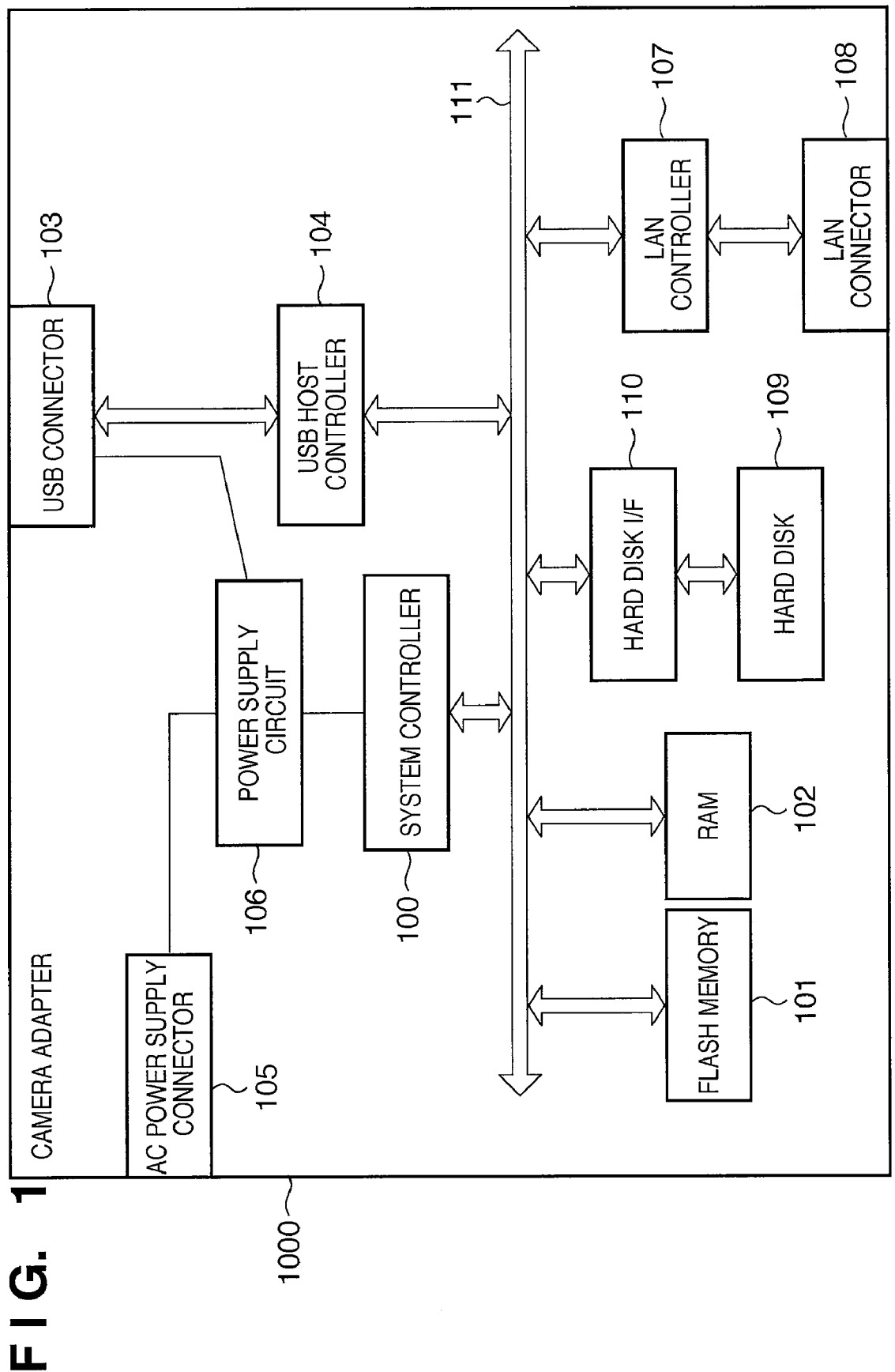
FIG. 1 is a block diagram showing the arrangement of an adapter according to an embodiment of the present invention.

FIG. 1 is a block diagram showing the arrangement of a camera adapter according to this embodiment.

A camera adapter (to be simply referred to as an adapter hereinafter) 1000 shown in FIG. 1 is connected to a camera which acquires image data by shooting an object image, as will be described later, and also connected to a client terminal via a network. That is, the adapter 1000 controls communication between the camera and the client terminal on the network.

In the adapter 1000, a system controller 100 collectively controls the overall operation of the adapter 1000. A flash memory 101 stores the operation programs and set values of the system controller 100. A RAM 102 temporarily stores data. A USB connector 103 connects a digital still camera (to be simply referred to as a camera hereinafter) via a USB cable. A USB host controller 104 communicates with the camera to control it or transmit/receive files to/from it.

Reference numeral 105 denotes an AC power supply connector. A power supply circuit 106 generates power to be supplied to the units of the adapter 1000, including the system controller 100, by converting power from the AC power supply. A LAN controller 107 communicates with a client terminal on the network. An RJ45 connector 108 connects a network cable. An internal hard disk 109 stores data received from the camera and data generated by the adapter 1000. Reference numeral 110 denotes a hard disk interface; and 111, a system bus of the system controller 100.

A web server function for making the adapter 1000 open on the network, and a JAVA® script and JAVA® program which are downloaded from a web server and run on a client are also stored in the flash memory 101.

Figure 2:
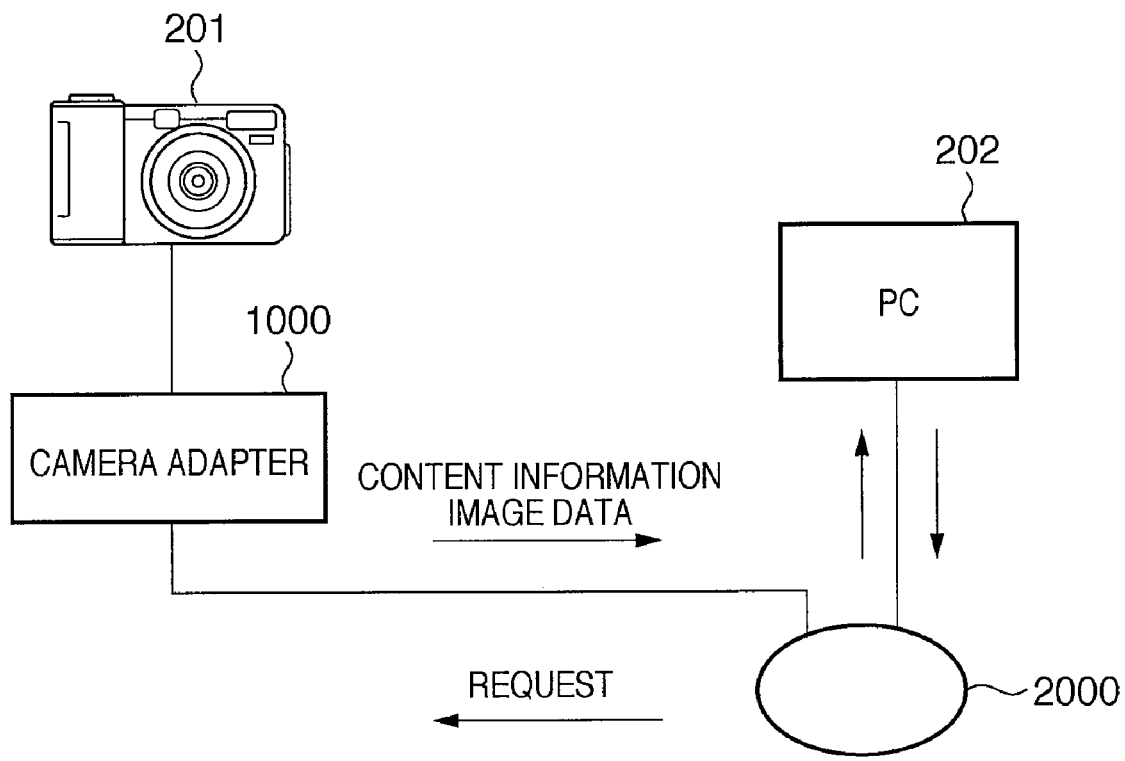
FIG. 2 is a view showing a system arrangement according to the embodiment.

FIG. 2 shows a connection example when a user uses the adapter 1000 shown in FIG. 1 in an ordinary home. The adapter 1000 is connected to a personal computer (to be referred to as a PC hereinafter) 202 serving as a client terminal via a home network 2000. The adapter 1000 and a camera 201 are connected by a USB cable.

The user can access a web page made open to the network by a web server running on the adapter 1000 by activating a web browser on the PC 202 and inputting a predetermined URL. As a result of access, a JAVA® program stored in the adapter 1000 is downloaded to the browser software in the PC 202 and starts execution so that an operation window provided by the adapter 1000 is displayed on the browser of the PC 202. It is possible to remote-control the operation of the camera 201 based on an operation signal to the operation window displayed on the PC 202.

● Process Mode

Functional modes supported by the camera 201 connected to the adapter 1000 in this embodiment are "direct transfer mode", "remote control mode", and "remote viewfinder mode". These modes of the camera 201 will be described below.

In the "direct transfer mode", an operation window is displayed on the liquid crystal monitor of the camera 201 connected by a USB so that the user selects an image to be transferred to the network as an open target by operating buttons of the camera 201.

In the "remote control mode", the user can externally control various functions of the camera 201 under the control of the USB interface. More specifically, it is possible to read out still image data accumulated in the camera and write still image data in the camera. The camera has a function of notifying an external device of a change in its state. Hence, the camera can notify a USB host device, as an event, that the user has pressed the shutter button of the camera 201. Even when the user presses the shutter button of the camera 201 in this mode, the shutter shooting function of the camera 201 is not executed. However, the adapter 1000 which has received the shutter button press event interprets it as a mode switching trigger.

In the "remote viewfinder mode", a live image of a shooting target displayed on the liquid crystal screen of the camera 201 can be transmitted to an external control device (the PC 202 in this case) via the USB interface. In this mode, the user issues a shooting instruction at a desired timing while confirming the live image of the sensing target displayed on the PC 202 so that the camera 201 can perform shutter shooting in accordance with the shooting instruction. Shooting parameter control such as image size setting and white balance setting, zoom control, and the like are also possible.

Note that these control modes of the camera 201 and functions made open to the network by the adapter 1000 (to be described later) have different names. Mode display on the user interface which is made open to the web browser by the adapter 1000 indicates not a mode of the camera 201 but a function provided by the adapter 1000.

Functional modes made open to the web browser by the adapter 1000 are "image open mode", "remote view mode", and "camera direct mode".

In the "image open mode", at least one image which is set, in the camera 201, to be transferred and made open is made open to a terminal (PC 202) on the network.

In the "remote view mode", shutter shooting of the camera 201 is implemented by a remote operation while displaying the preview window of the camera 201 on the terminal (PC 202) on the network.

In the "camera direct mode", the user directly selects an image to be made open to the network by operating the user interface on the camera 201 connected to the adapter 1000 and immediately updates display of the open window.

Details of these modes will be described later.
● Communication Control

FIGS. 3A to 3D are flowcharts illustrating communication control of the adapter 1000 when the camera 201 is being connected to it. This embodiment will be described below in detail with reference to the flowcharts.
● Initialization Processing at Time of Connection Initialization processing in connecting the camera 201 to the adapter 1000 will be described with reference to the flowchart in FIG. 3A.

When the user connects the camera 201 to the USB connector 103 of the adapter 1000 via a USB interface, the USB host controller 104 in the adapter 1000 detects the connection of the camera 201 and notifies the system controller 100 of it (S101).

Upon detecting the connection of the camera 201, the system controller 100 starts a camera connection sequence via the USB host controller 104. More specifically, USB address setting and USB construction are performed for the camera 201 as USB device initialization processing. Additionally, the adapter acquires supported communication protocol information, thereby confirming that the camera supports the PTP (Picture Transfer Protocol) protocol (S102).

Next, the adapter starts a communication session with the camera 201 using the PTP protocol to acquire the model information of the camera 201 and PTP capability information including PTP commands, properties, and events supported by the camera 201. Based on the supported PTP command information, the adapter confirms that the camera 201 supports the direct transfer function, remote control function, and remote viewfinder function (S103).

Figure 3A:
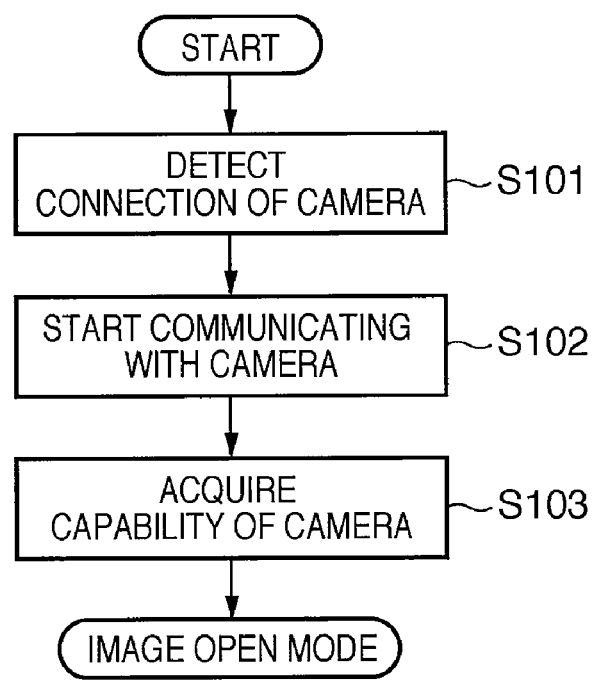
FIG. 3A is a flowchart illustrating the initialization processing of the adapter according to the embodiment at the time of connection.
Figure 3B:
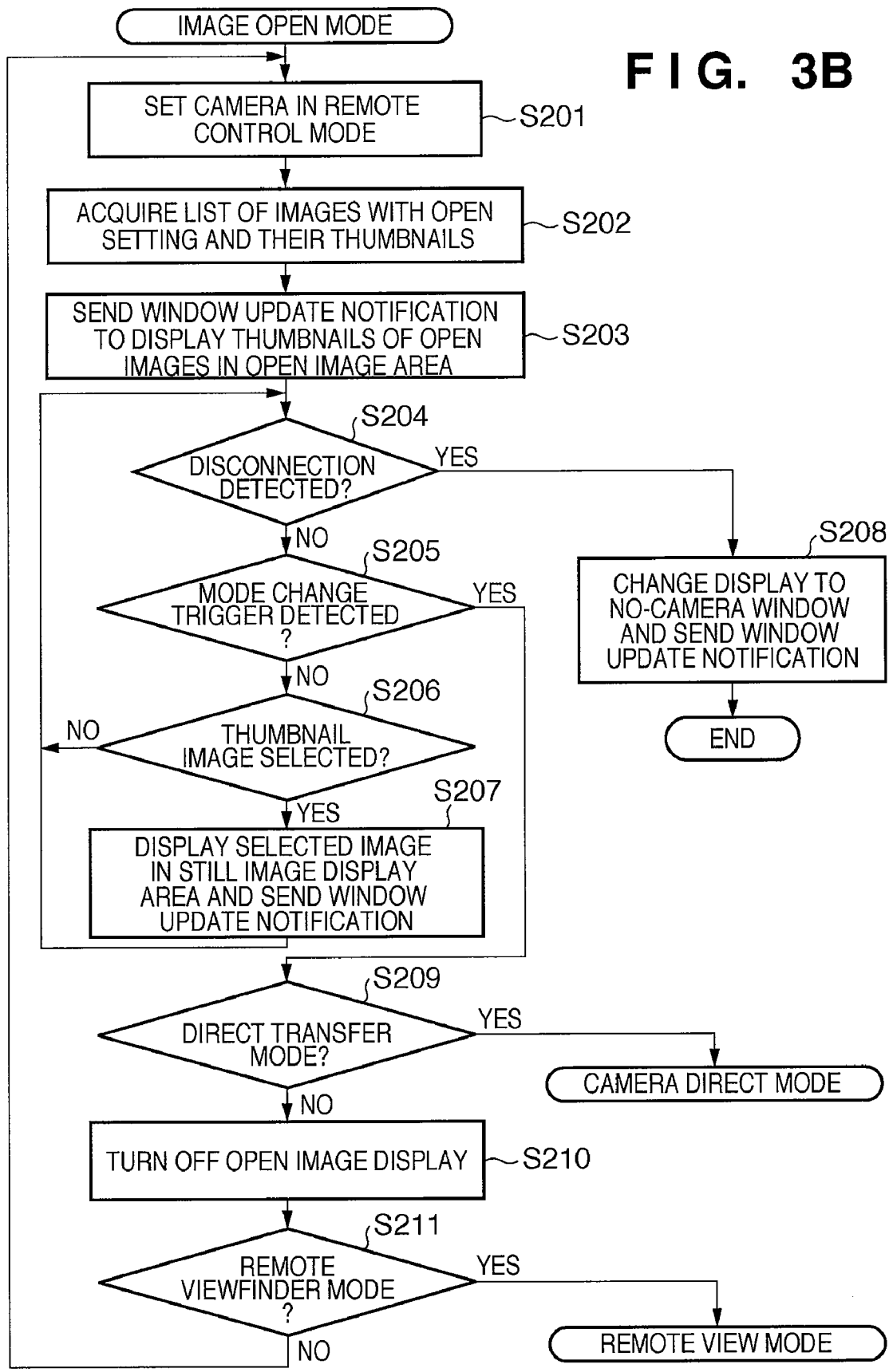
FIG. 3B is a flowchart illustrating the processing of the adapter according to the embodiment in an image open mode.

When the above processing finishes, the adapter 1000 shifts to the "image open mode".
● Image Open Mode The processing of the adapter 1000 in the "image open mode" will be described with reference to the flowchart in FIG. 3B.

First, the adapter transmits a PTP command to the camera 201 via the USB host controller 104 to set the camera 201 in the "remote control mode" (S201). When the camera 201 is in the "remote control mode", the adapter 1000 can acquire an image file stored in a recording medium in the camera 201, or a shutter button press event.

If there are files for which transmission setting, that is, open permission is made by the user interface operation on the camera 201 before it is connected to the adapter 1000, a transmission setting script file has been created on the recording medium in the camera 201. If a created transmission setting script file is present, the adapter acquires it from the camera 201, checks an image list described in the script file, and acquires the thumbnail images of the listed files from the camera 201 (S202). In this way, the adapter acquires, from the camera 201, all pieces of information necessary for making the images open.

The adapter notifies the PC 202 of update of the window to display the acquired thumbnail images in an open image area on the client terminal, that is, PC 202 (S203).

FIG. 4A shows an example of an operation window displayed in the image open mode on the web browser of the PC 202. The operation window display shown in FIG. 4A indicates at its lower part that the current process mode of the adapter 1000 is the "image open mode". This window will be referred to as an image open window hereinafter. In the image open window shown in FIG. 4A, the rectangular area on the left side is the open image area where the above-described thumbnail images are displayed. FIG. 4A shows six thumbnail images.

If neither disconnection of the camera 201 (S204) nor a mode change trigger (to be described later) (S205) is detected, the adapter waits until the user selects a thumbnail image from the web browser (S206).

When the user selects a thumbnail image from the open image area by a web browser operation on the PC 202 (S206), the JAVA® program running on the web browser notifies the adapter 1000 of the selected file. The adapter 1000 acquires the original image of the selected file from the camera 201 and notifies the PC 202 of update of the window to display the original image in a still image display area (the rectangular area on the right side of FIG. 4A) on the PC 202 (S207). FIG. 4B showing an example in which the original image of a thumbnail image selected from the open image area on the image open window shown in FIG. 4A is displayed in the still image area.

On the other hand, upon detecting disconnection of the camera 201 in step S204, the adapter turns off display of the thumbnail images and still image on the PC 202, notifies the PC 202 of update of the window to display a no-camera window (S208), and finishes the processing.

When the user presses the shutter button of the camera 201, the adapter 1000 receives the shutter button press event from the camera 201 and interprets it as a mode change trigger. Upon detecting the mode change trigger in step S205, the process advances to step S209 to determine whether the mode change trigger indicates a request of "direct transfer mode".

Figure 5A:
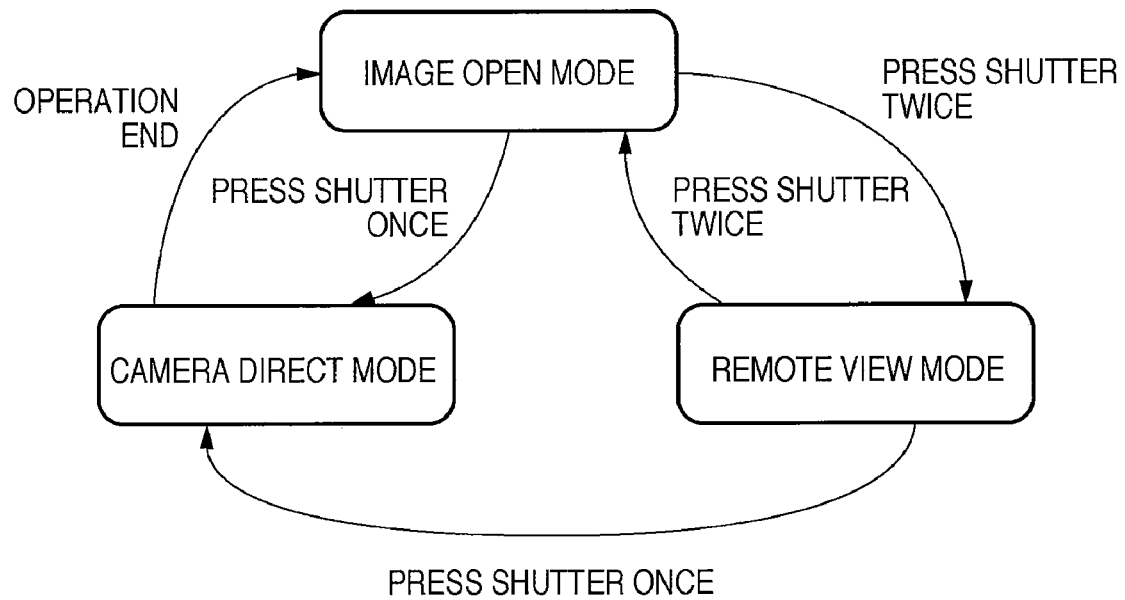
FIG. 5A is a view showing mode transition of the adapter according to the embodiment.
Figure 5B:
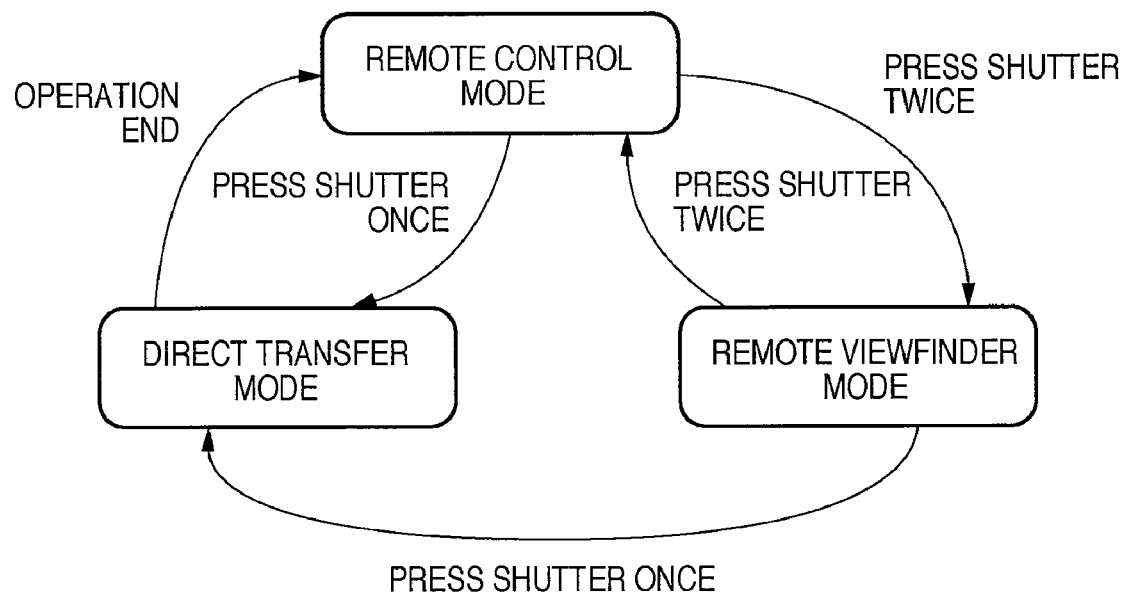
FIG. 5B is a view showing mode transition of a camera according to the embodiment.

FIG. 5A shows an example of mode transition of the adapter 1000 upon pressing the shutter button of the camera 201. FIG. 5B shows an example of mode transition requested by the camera 201.

According to FIG. 5B, upon detecting in the image open mode that the user has pressed the shutter button of the camera 201 once, the adapter 1000 interprets that the camera 201 requests the "direct transfer mode". If the camera 201 requests the "direct transfer mode" (S209), the adapter 1000 shifts from the "image open mode" to the "camera direct mode", as shown in FIG. 5A.

If NO in step S209, the adapter turns off the open image area display (S210) and determines whether the image mode change trigger indicates a request of "remote viewfinder mode" (S211). More specifically, as shown in FIG. 5B, upon detecting that the user has pressed the shutter button of the camera 201 continuously twice within a predetermined time, the adapter 1000 interprets that the camera 201 requests the "remote viewfinder mode". The adapter 1000 itself advances to the processing of the "remote view mode". If NO in step S211, the process returns to step S201.

● Camera Direct Mode

Figure 3C:
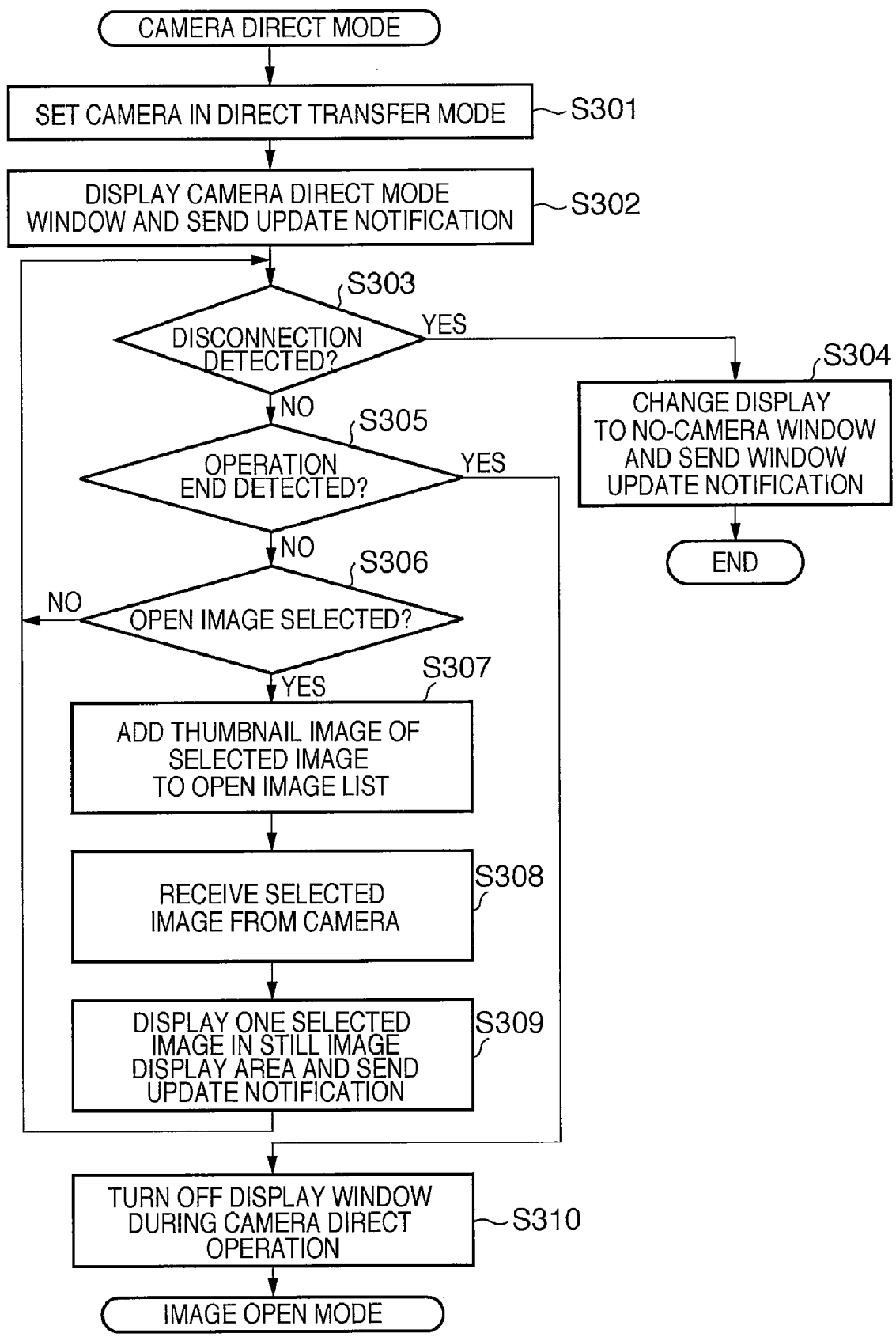
FIG. 3C is a flowchart illustrating the processing of the adapter according to the embodiment in a camera direct mode.

The processing of the adapter 1000 in the "camera direct mode" will be described next with reference to the flowchart in FIG. 3C.

First, the adapter transmits a PTP command to the camera 201 to set it in the "direct transfer mode" (S301). The adapter notifies the PC 202 to change the image open window displayed on it to a window in the "camera direct mode" (to be referred to as a camera direct window hereinafter) (S302). Checked to Here FIG. 4C shows an example of the camera direct window. The "camera direct mode" of this embodiment is a mode to update the display window on the PC 202 by the operation of the camera 201. For this reason, a message representing that the remote operation of the camera 201 from the PC 202 is disabled is displayed in the open image area, as shown in FIG. 4C.

If neither disconnection of the camera 201 (S303) nor an instruction to end the operation in the camera direct mode (to be described later) (S305) is detected, the adapter waits until the user selects an open image on the camera 201 (S306).

Figure 6A:
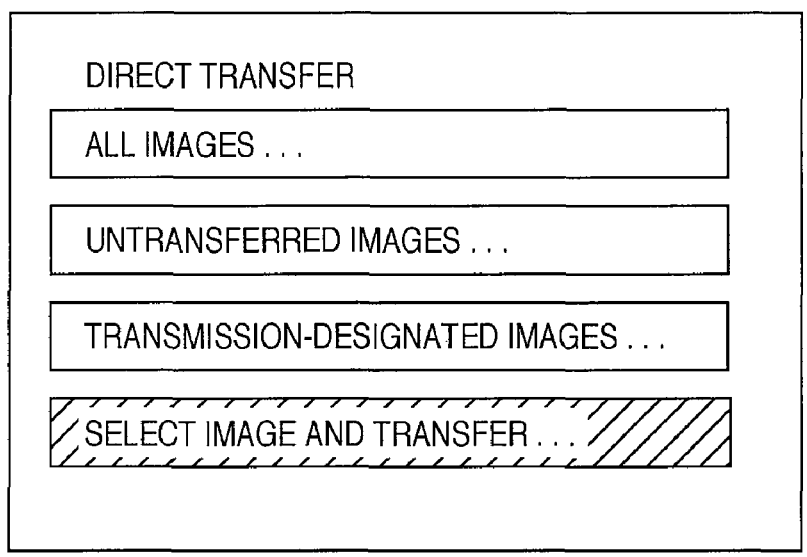
FIG. 6A is a view showing an example of a monitor window in a direct transfer mode of the camera according to the embodiment.
Figure 6B:
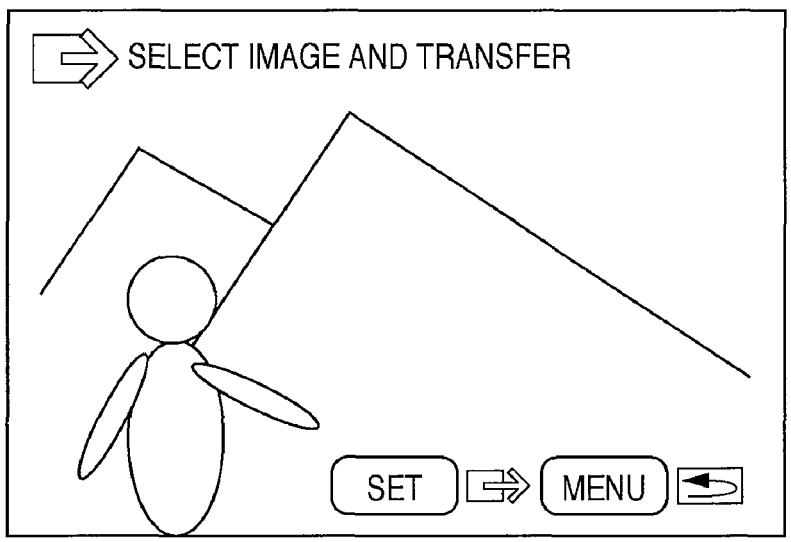
FIG. 6B is a view showing another example of the monitor window in the direct transfer mode of the camera according to the embodiment.

FIG. 6A shows an example of display on the liquid crystal display screen of the camera 201 in the camera direct mode. In the window, when the user moves the cursor to "select image and transfer . . . " using an operation button and presses a selector button, the window changes to an individual image selection window as shown in FIG. 6B. In the window, the user can display a preceding image or succeeding image by operating left and right buttons (not shown). When the user selects image transfer by pressing the "SET" button, the transfer image selection event is transmitted to the adapter 1000.

Upon receiving the image selection event, the adapter 1000 determines that an open image has been selected (S306), acquires the information of the selected file from the camera 201, and adds the thumbnail image to the open image area of the PC 202 (S307).

Next, the adapter acquires the original image of the selected image from the camera 201 (S308), and notifies the PC 202 of update of the window to display the selected image or, if a plurality of images are selected, the first image on the still image display area of the PC 202 (S309).

FIG. 4D shows an example in which an image selected on the camera 201 is displayed in the still image area of the camera direct window shown in FIG. 4C.

Every time the user repeats the above-described image selection and transfer request on the camera 201, i.e., presses the "SET" button of the camera 201, a newly selected image is displayed in the still image display area of the PC 202.

On the other hand, upon detecting disconnection of the camera 201 in step S303, the adapter turns off display of the thumbnail images and still image on the PC 202, notifies the PC 202 of update of the window to display a no-camera window (S304), and finishes the processing.

When the user presses the "MENU" button on the window of the camera 201 shown in FIG. 6B, the window display returns to the state in FIG. 6A. At this time, the camera 201 notifies the adapter 1000 of the menu window display event. The adapter 1000 receives the menu window display event and interprets it as a direct transfer mode operation end trigger. Upon receiving the direct transfer operation end trigger in step S305, the adapter notifies the PC 202 of update of the window to turn off the display window during direct transfer (S310). The processing shifts to the "image open mode". The direct transfer mode menu window displayed on the camera 201 is turned off at the start of the processing in the "image open mode" shown in FIG. 3B (S201).

Figure 4E:
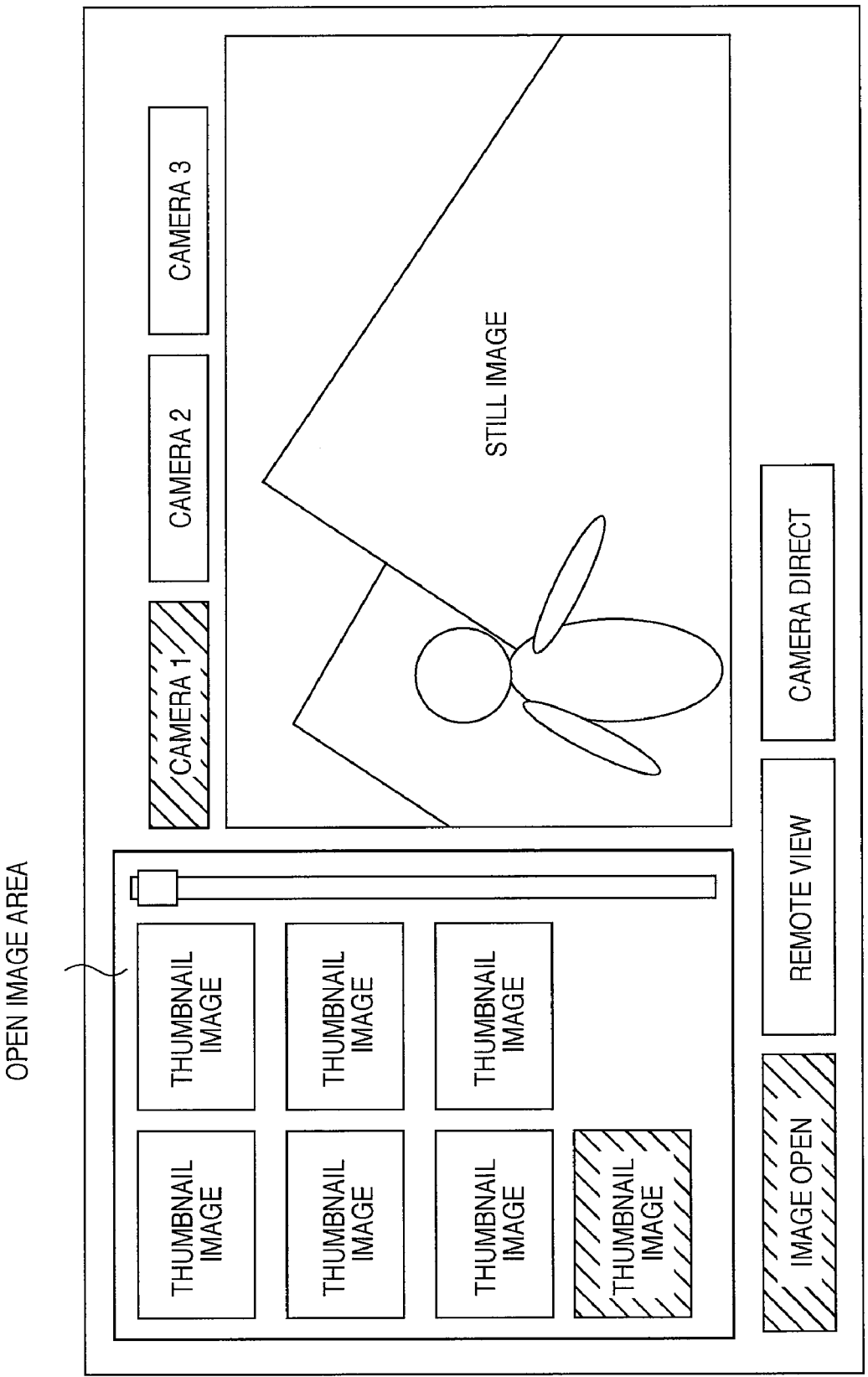
FIG. 4E is a view showing an example of the window made open to the client PC immediately after the change from the camera direct mode to the image open mode of this embodiment.

FIG. 4E shows a display example on the PC 202 when the processing returns to the "image open mode" immediately after an image is selected in the "camera direct mode". As compared with FIG. 4A or 4B, the thumbnail image of the selected image is added to the open image area.

● Remote View Mode

Figure 3D:
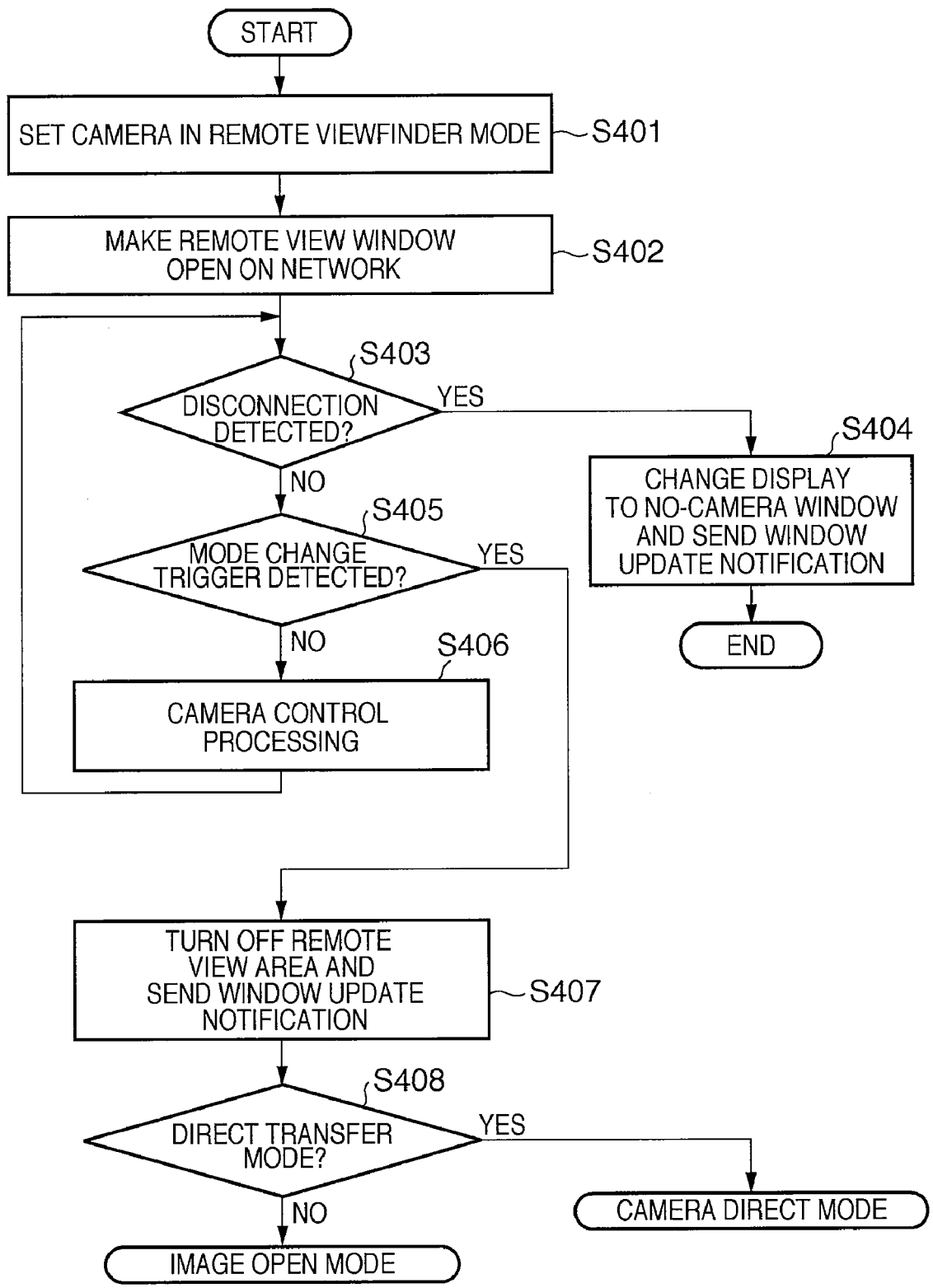
FIG. 3D is a flowchart illustrating the processing of the adapter according to the embodiment in a remote view mode.

The processing of the adapter 1000 in the "remote view mode" will be described next with reference to the flowchart in FIG. 3D.

First, the adapter transmits a PTP command to the camera 201 to set it in the "remote viewfinder mode" (S401). The adapter starts receiving a viewfinder image that is the object image on the camera 201 and makes the viewfinder image open on the network (S402).

Upon detecting disconnection of the camera 201 (S403), the adapter notifies the PC 202 of update of the window to display a no-camera window (S404), and finishes the processing.

If no mode change trigger is detected (S405), the adapter processes a camera control request from the PC 202 (S406). For example, shooting by the camera 201 is executed based on a shooting instruction from the PC 202.

Camera control processing in the remote view mode in step S406 will be described. FIG. 4F shows an example of a remote view window on the PC 202 in the remote view mode. A viewfinder image is displayed as a preview image in a preview area at the upper left of FIG. 4F. At this time, zoom control of the camera 201 is done using the slide bar on the right side of the preview image. Various kinds of shooting parameters are controlled using the buttons on the lower side of the preview image. Shutter shooting can be done by the "shoot" button on the lower side of the slide bar.

Figure 4G:
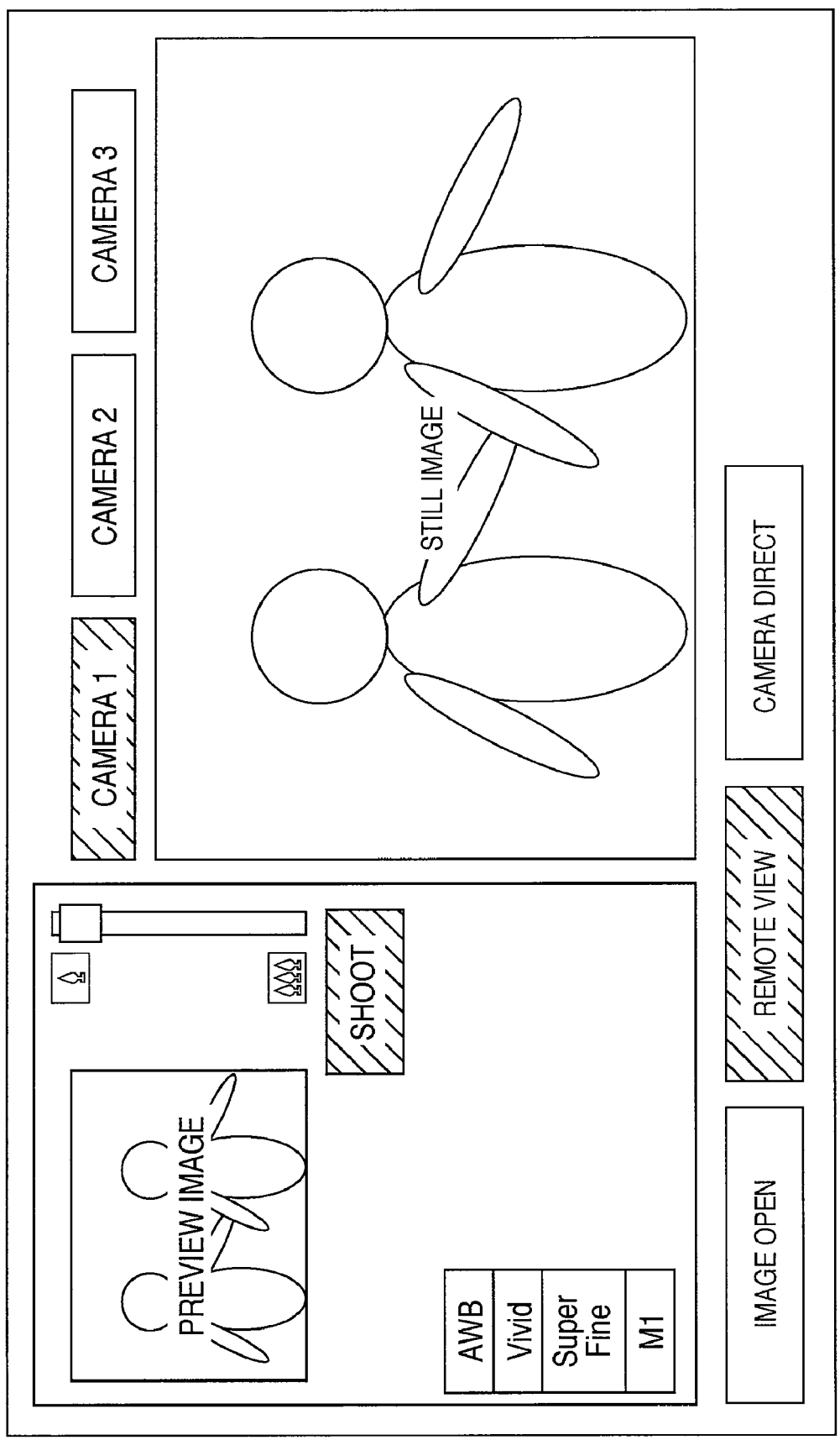
FIG. 4G is a view showing another example of the window made open to the client PC in the remote view mode of this embodiment.

The adapter 1000 receives a request by the window operation on the PC 202 and transmits a command corresponding to each request to the camera 201. For example, upon receiving a shutter shooting request, the adapter executes shutter shooting of the camera 201, receives the obtained still image from the camera 201, and notifies the PC 202 to display the obtained image in the still image display area of the PC 202. FIG. 4G shows a display example of an obtained image in the remote view mode.

When the user presses the shutter button on the camera 201, the adapter 1000 receives the shutter button press event from the camera 201 and interprets it as a mode change trigger. Upon receiving the mode change trigger in step S405, the adapter notifies the PC 202 of update of the window to turn off the display of the remote view window (S407).

The process advances to step S408 to determine whether the mode change trigger indicates a request of "direct transfer mode". According to FIG. 5B, when the user presses the shutter button of the camera 201 once in the remote viewfinder mode, the adapter 1000 interprets that the camera 201 requests the "direct transfer mode". In this case, the adapter 1000 shifts from the "remote view mode" to the "camera direct mode", as shown in FIG. 5A.

Upon receiving the shutter event twice within a predetermined time, the adapter 1000 interprets that the camera 201 requests the "remote control mode" and advances to the processing of the "image open mode".

As described above, according to this embodiment, the operation window displayed on the client PC 202 is changed in accordance with the mode change trigger operation on the camera 201. This allows the PC 202 to execute an operation corresponding to the current process mode.

When the camera 201 is set in the "direct transfer mode", only an image selected on the liquid crystal screen of the camera 201 can be made open on the network.

It is also possible to control an image displayed on the PC 202 by the operation on the camera 201.

Second Embodiment

The second embodiment of the present invention will be described below. In the above-described first embodiment, shutter button press on the camera 201 is employed as a mode change trigger. However, detection of a mode change trigger of the present invention is not limited to this example. In the second embodiment, a mode change switch is prepared on the main body of a camera 201 so that the user can change the mode by operating the change switch.

Figure 7:
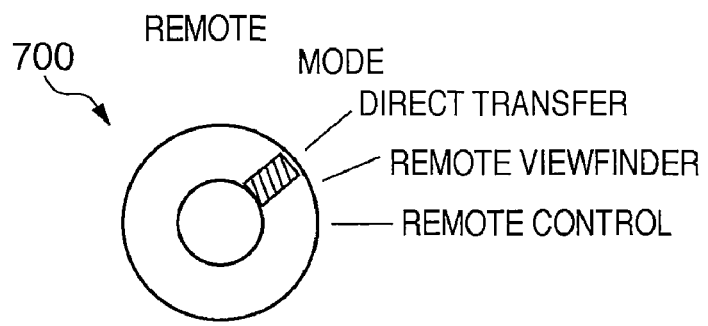
FIG. 7 is a view showing the outer appearance of the connection mode switch of a camera according to the second embodiment.

In the second embodiment, an adapter 1000 and a system arrangement using it are the same as in the above-described first embodiment. However, for example, a rotary mode change switch (to be referred to as a mode switch hereinafter) 700 as shown in FIG. 7 is prepared on the main body of the camera 201. The user can select one of "direct transfer", "remote viewfinder", and "remote control" by operating the mode change switch 700. More specifically, when the user rotates the mode change switch at an arbitrary timing, a mode change trigger is generated.

The adapter 1000 can acquire, from the camera 201, the position information of the mode switch of the camera 201.

Figure 8:
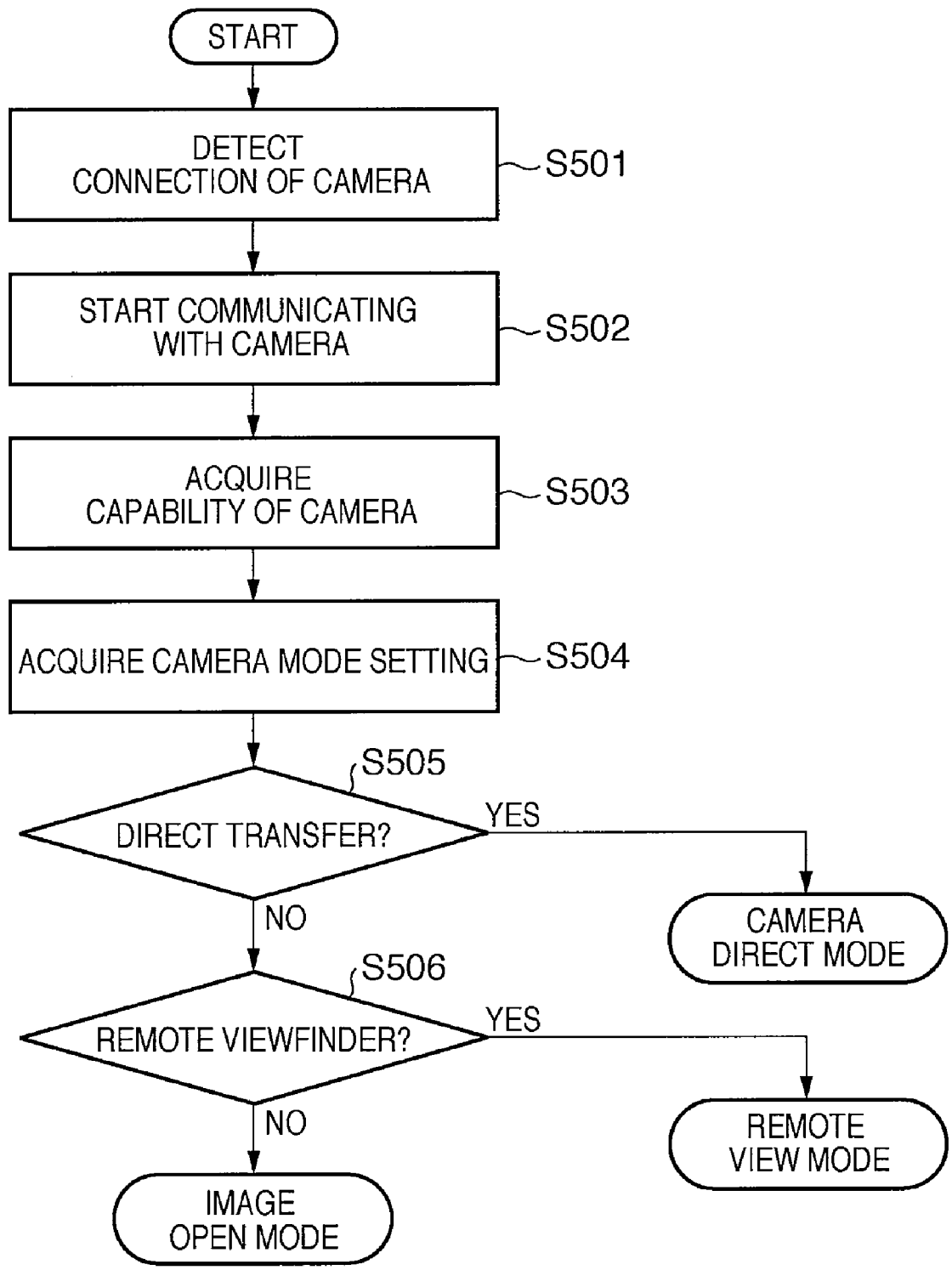
FIG. 8 is a flowchart illustrating adapter processing according to the second embodiment.

FIG. 8 illustrates initialization processing in connecting the camera 201 to the adapter 1000 according to the second embodiment. Processing in steps S501 to S503 in FIG. 8 is the same as in steps S101 to S103 in FIG. 3A, and a description thereof will not be repeated.

In step S504, the adapter acquires the mode switch position of the camera 201. If the mode switch 700 of the camera 201 is set to "direct transfer" (S505), the adapter 1000 advances to the processing of the "camera direct mode" described in the first embodiment. If the mode switch 700 of the camera 201 is set to "remote viewfinder" (S506), the adapter 1000 advances to the processing of the "remote view mode" described in the first embodiment. If the mode switch 700 is set to neither of them, i.e., if the mode switch is set to "remote control", the adapter advances to the processing of the "image open mode" described in the first embodiment.

As described above, according to the second embodiment, the camera 201 has the mode switch 700. It is possible to immediately designate the mode upon connection by the setting of the mode switch 700 when the camera 201 is connected to the adapter 1000.

Third Embodiment

The third embodiment of the present invention will be described below. In the above-described first and second embodiments, only one camera 201 is connected to the adapter 1000. In the third embodiment, a plurality of cameras are connectable.

FIG. 9 is a view showing an example of a system arrangement according to the third embodiment. A plurality of cameras 301, 302, and 303 are simultaneously connected to an adapter 1100 wirelessly by a USB.

The arrangement of the adapter 1100 is the same as that of the adapter 1000 described in the first and second embodiments.

In the third embodiment, one of the plurality of cameras 301 to 303, which has generated a camera direct trigger, is set as an open image transmission source camera, whereas the remaining cameras are set as open image transmission destination cameras. As a characteristic feature, one transmission source camera distributes images to a plurality of transmission destination cameras.

In the third camera as well, the adapter 1100 shifts to the "image open mode" to control the plurality of connected cameras to the "remote control mode", as in the first embodiment.

When a camera is in the "remote control mode", and the user presses the shutter button of the camera once, the adapter 1100 interprets the shutter press event as a trigger to the "direct transfer mode" in that camera. If a camera is already in the "direct transfer mode", and the user presses the shutter button of another camera twice within a predetermined time, the adapter 1100 interprets the shutter reception event as an image reception request.

Figure 10:
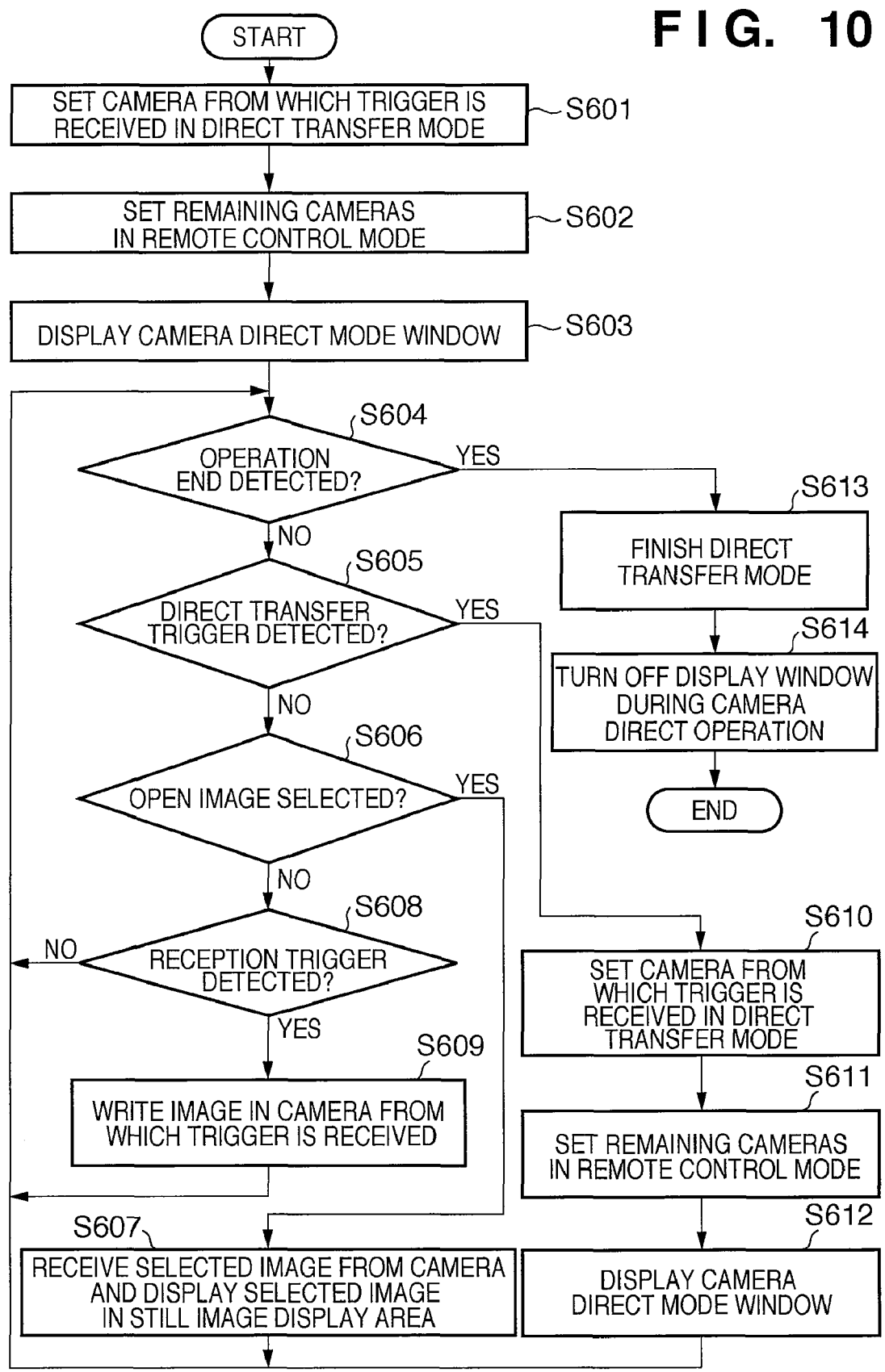
FIG. 10 is a flowchart illustrating adapter processing according to the third embodiment.

FIG. 10 is a flowchart illustrating processing of the adapter 1100 upon receiving a "direct transfer mode" trigger from a camera. The camera from which the adapter 1100 has received the trigger will be defined as a transmission source camera hereinafter.

First, the adapter 1100 sets the transmission source camera that has generated the trigger in the "direct transfer mode" (S601), sets the remaining cameras serving as transmission destination cameras in the "remote control mode" (S602), and displays a camera direct window on a PC 202 (S603).

If neither the end of the operation in the "direct transfer mode" in the transmission source camera (S604) nor a "direct transfer mode" trigger from any transmission destination camera (S605) is detected, the adapter determines whether an open image is selected on the transmission source camera (S606). This determination is done based on the presence/absence of image selection event reception, as in step S306 of FIG. 3C in the above-described first embodiment. Upon determining that an open image is selected on the transmission source camera (S606), the adapter 1100 receives the selected image from the transmission source camera and displays it in the still image display area of the PC 202 (S607). The process returns to step S604.

On the other hand, upon determining that no open image is selected on the transmission source camera, the adapter 1100 determines whether an image reception trigger is received from any transmission destination camera (S608). A transmission destination camera generates an image reception trigger in accordance with a predetermined operation. The operation can be a predetermined number of times of shutter press or an operation of a dedicated switch. Upon detecting an image reception trigger from a transmission destination camera, the adapter writes the image in the camera (S609), and the process returns to step S604.

Upon receiving a "direct transfer" trigger from any transmission destination camera in step S605, the adapter sets the camera from which the trigger is received in the "direct transfer mode" (S610), and sets the remaining cameras in the "remote control mode" to enable external control (S611). The adapter 1100 displays the camera direct window (S612), and the process returns to step S604.

Upon detecting an end operation in step S604, the adapter 1100 finishes the "direct transfer mode" (S613), turns off the display window during the camera direct operation (S614), and finishes the processing.

As described above, according to the third embodiment, in the system connected to a plurality of transmission destination cameras, it is possible to receive a desired open image by operating each transmission destination camera while observing the open image on the PC 202 that is a common client terminal.

Fourth Embodiment

The fourth embodiment of the present invention will be described below.

In the above-described first to third embodiments, the present invention is applied to an adapter connected to a camera. Instead of using a camera and an adapter as separate devices, a camera integrated with a communication interface may be used.

Figure 11:
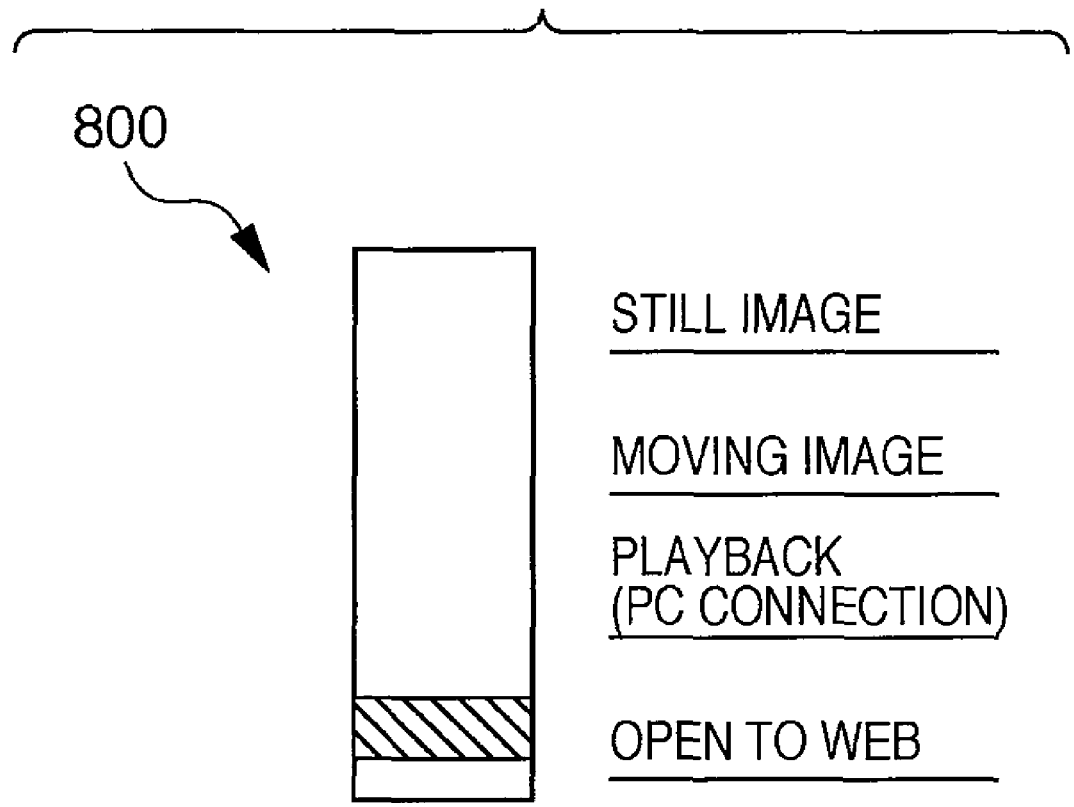
FIG. 11 is a view showing the outer appearance of the operation mode switch of a camera according to the fourth embodiment.

In this case, in addition to the mode switch 700 shown in FIG. 7, an operation selection switch 800 as shown in FIG. 11 is provided on the camera body to set the camera operation. More specifically, when the operation selection switch 800 is set at "open to Web", a mode to make the function of the camera open to the network is set. A web server function operates, and the camera mode selection switch shown in FIG. 7 is enabled.

As described above, according to the fourth embodiment, the camera and adapter are integrated to provide, on the camera, an operation switch suitable for open to the network. Hence, the mode change operation can become more user-friendly.

Other Embodiments

The embodiments of the present invention have been described above in detail. The present invention can take a form of, e.g., a system, apparatus, method, program, or recording medium (storage medium). More specifically, the present invention is applicable to a system including a plurality of devices (e.g., host computer, interface device, image capturing apparatus, and web application) or an apparatus including a single device.

The present invention is also achieved even by supplying a software program which implements the functions of the above-described embodiments to the system or apparatus directly or from a remote site and causing the computer of the system or apparatus to read out and execute the supplied program codes. In this case, the program is computer-readable and corresponds to the flowcharts illustrated in the embodiments.

Hence, the program code itself, which is installed in a computer to implement the functional processing of the present invention by the computer, also implements the present invention. That is, the present invention incorporates the computer program itself for implementing the functional processing of the present invention.

In this case, the program can take any form such as an object code, a program to be executed by an interpreter, or script data to be supplied to the OS as long as the functions of the program can be obtained.

Examples of the recording medium to supply the program are a Floppy® disk, hard disk, optical disk, magnetooptical disk, MO, CD-ROM, CD-R, CD-RW, magnetic tape, nonvolatile memory card, ROM, and DVD (DVD-ROM or DVD-R).

As another program supply method, a client computer may be connected to a homepage on the Internet by using a browser and download the computer program itself of the present invention (or a compressed file containing an automatic install function) from the homepage to a recording medium such as a hard disk. The program code contained in the program of the present invention may be divided into a plurality of files, and the files may be downloaded from different homepages. That is, a WWW server which causes a plurality of users to download a program file that causes a computer to implement the functional processing of the present invention is also incorporated in the present invention.

The program of the present invention may be encrypted, stored in a storage medium such as a CD-ROM, and distributed to users. Any user who satisfies predetermined conditions may be allowed to download key information for decryption from a homepage via the Internet. The user can execute the encrypted program by using the key information and install the program in the computer.

The functions of the above-described embodiments are implemented when computer executes the readout program. The functions of the above-described embodiments are also implemented when, e.g., the OS running on the computer partially or wholly executes actual processing based on the instructions of the program.

The functions of the above-described embodiments are also implemented when the program read out from the recording medium is written in the memory of a function expansion board inserted into the computer or a function expansion unit connected to the computer and executed. More specifically, the CPU of the function expansion board or function expansion unit can partially or wholly execute actual processing based on the instructions of the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-204572, filed Aug. 6, 2007, which is hereby incorporated by reference herein in its entirety.

What is claimed is:

1. An adapter in a system where a control apparatus controls an image capturing apparatus via the adapter, comprising:
    a first control unit adapted to invalidate control from the control apparatus for the image capturing apparatus into which power is being input, and adapted to cause the control apparatus to display that the control for the image capturing apparatus is invalid in the control apparatus, when an image which is stored in the image capturing apparatus is selected by a user operation in the image capturing apparatus; and
    a display control unit adapted to transfer the selected image and a thumbnail image thereof via the adapter from the image capturing apparatus to the control apparatus and adapted to cause the control apparatus to display the selected image, when the image is selected by the user operation.

2. The adapter according to claim 1, further comprising a second control unit adapted to control an operation of the image capturing apparatus based on an operation signal from the control apparatus.

3. The adapter according to claim 1, further comprising a trigger reception unit adapted to receive, from the image capturing apparatus, a trigger representing change of the process mode,
    wherein said display control unit changes an operation window displayed on the control apparatus upon receiving the trigger.

4. The apparatus according to claim 1, further comprising a transfer unit adapted to, when a plurality of image capturing apparatuses are connected, transfer an image transferred from one of the plurality of image capturing apparatuses, which is set in the second mode, to the remaining image capturing apparatuses.

5. The apparatus according to claim 4, wherein
the client apparatus can write image data in the image capturing apparatus in the first mode, and
when one of the plurality of image capturing apparatuses is set in the second mode, said transfer unit sets the remaining image capturing apparatuses in the first mode.

6. A non-transitory computer-readable storage medium storing a computer program which, when executed by a processor of an adapter, causes the adapter to function as the adapter according to claim 1 in a system where a control apparatus controls an image capturing apparatus via the adapter of claim 1.

7. The adapter according to claim 1 wherein even when a plurality of images are selected in the image capturing apparatus, the display control unit causes the control apparatus to display an image of the plurality of selected images.

8. The adapter according to claim 1, further comprising a deleting unit adapted to delete a display of the image which the display control unit has caused the control apparatus to display, when the adapter and the image capturing apparatus are disconnected.

9. The adapter according to claim 1, further comprising a deleting unit adapted to delete a display of the image which the display control unit has caused the control apparatus to display, in response to a mode switching of the image capturing apparatus from the predetermined mode to the other mode.

10. The adapter according to claim 1 wherein the display control unit does not cause the control unit to display a thumbnail image of the image stored in the image capturing apparatus when the image capturing apparatus is in a predetermined mode, and causes the control unit to display a thumbnail image of the image stored in the image capturing apparatus when the image capturing apparatus is in a mode which receives the control from the control apparatus.

11. A control method of an adapter in a system where a control apparatus controls an image capturing apparatus via the adapter, comprising:
invalidating control from the control apparatus for the image capturing apparatus into which power is being input, and causing the control apparatus to display that the control for the image capturing apparatus is invalid in the control apparatus, when an image which is stored in the image capturing apparatus is selected by a user operation in the image capturing apparatus; and
transferring the selected image and a thumbnail image thereof via the adapter from the image capturing apparatus to the control apparatus and causing the control apparatus to display the selected image, when the image is selected by the user operation.

* * * * *